(12) United States Patent
Nowak et al.

(10) Patent No.: US 7,926,457 B2
(45) Date of Patent: Apr. 19, 2011

(54) DEVICE FOR PHASE-SHIFTING THE ROTATIONAL ANGLE OF A DRIVE WHEEL RELATIVE TO AN OUTPUT SHAFT

(75) Inventors: Martin Nowak, Duesseldorf (DE); Heinrich Dismon, Gangelt (DE); Karsten Grimm, Aachen (DE)

(73) Assignee: Pierburg GmbH, Neuss (DE)

( * ) Notice: Subject to any disclaimer, the term of this patent is extended or adjusted under 35 U.S.C. 154(b) by 218 days.

(21) Appl. No.: 12/431,126

(22) Filed: Apr. 28, 2009

(65) Prior Publication Data
US 2009/0270214 A1    Oct. 29, 2009

(30) Foreign Application Priority Data
Apr. 28, 2008   (DE) .................. 10 2008 021 220

(51) Int. Cl.
*F01L 1/02*   (2006.01)
(52) U.S. Cl. .................. 123/90.31; 123/90.16; 464/160; 475/331
(58) Field of Classification Search ............... 123/90.16, 123/90.27, 90.31; 464/1, 2, 160; 475/4, 475/228, 331
See application file for complete search history.

(56) References Cited

U.S. PATENT DOCUMENTS

| 5,680,836 | A | 10/1997 | Pierik |
| 7,506,623 | B2 | 3/2009 | Schafer et al. |
| 7,717,072 | B2 * | 5/2010 | Schafer et al. ............. 123/90.15 |

FOREIGN PATENT DOCUMENTS

| DE | 7337206 | 10/1974 |
| DE | 102005018956 | 11/2006 |

\* cited by examiner

*Primary Examiner* — Ching Chang
(74) *Attorney, Agent, or Firm* — Norman B. Thot

(57) ABSTRACT

A device for phase-shifting a rotational angle of a drive wheel relative to an output shaft. The device includes a planetary gear including a sun wheel, a hollow wheel and at least one planet wheel, wherein the sun wheel and the hollow wheel mesh with the at least one planet wheel. A planet wheel carrier having the at least one planet wheel is arranged thereon and is fixedly connected to the output shaft so as to commonly rotate with the output shaft. A drive wheel is connected to the planetary gear and is at least indirectly connected to the sun wheel. An actuator engages the planetary gear so that the hollow wheel is rotatable relative to the sun wheel. The actuator is disposed tangentially to the planetary gear and includes a worm engaging an outer toothing of the hollow wheel, with the sun wheel being at least indirectly connected to the drive wheel.

7 Claims, 2 Drawing Sheets

DEVICE FOR PHASE-SHIFTING THE ROTATIONAL ANGLE OF A DRIVE WHEEL RELATIVE TO AN OUTPUT SHAFT

CROSS REFERENCE TO PRIOR APPLICATIONS

Priority is claimed to German Patent Application No. DE 10 2008 021 220.2, filed Apr. 28, 2008. The entire disclosure of said application is incorporated by reference herein.

BACKGROUND

The present invention relates to a device for phase-shifting the rotational angle of a drive wheel relative to an output shaft, particularly a camshaft of an internal combustion engine, said device comprising a planetary gear including a sun wheel and a hollow wheel, said wheels meshing with at least one planet wheel, said device further comprising a planet wheel carrier having said at least one planet wheel arranged thereon and being connected at least to the output shaft for common rotation therewith, a drive wheel connected to the planetary gear, and an actuator engaging the planetary gear in such a manner that the hollow wheel is rotatable relative to the sun wheel.

FIELD

Devices of this type are particularly known for phase-shifting between a crankshaft and a camshaft of an internal combustion engine but in the field of internal combustion engines can also be used for cycle-oriented control of an exhaust-gas return system. The phase-shifting serves for variable timing of valves with the aim of improving the combustion process in the engine. For phase-shifting the camshaft, it is known to use e.g. vane-type cam adjusters, camshaft chain adjusters or axially displaceable toothing elements. The use of electric phase adjusters operated by means of a planetary gear has proven to be of particular advantage. These phase adjusters offer the option of stepless adjustment, thus accomplishing high variability.

DE 10 2005 018 956 A1 describes a system for the relative adjustment of the angular positions of the crankshaft and the camshaft, in which system a planetary gear is used. This system comprises a drive wheel driven by the crankshaft and formed with an inner toothing, said drive wheel being arranged to mesh with a plurality of planet wheels. The latter are provided on a planet wheel carrier which is adjustable via an actuator. A second hollow wheel with inner toothing is fastened to the camshaft and is also arranged to mesh with the planet wheels. In such an embodiment, it is required to install a coupling between the actuator and the planet wheel carrier so as to compensate for the radial clearance. When using such a dual planetary gear with different toothings in the two hollow wheels, it is not possible to obtain a continuous gear reduction without permanent correction by the actuator since, in the absence of such correction, the synchronization of the crankshaft and camshaft would be lost. Thus, this system will entail a permanent consumption of power by the electric actuator.

U.S. Pat. No. 5,680,836 describes a system designed for phase shifting between a camshaft and a crankshaft and provided with a planetary gear. In this system, the planet wheel carrier is fixedly arranged on a camshaft, the planet wheels engaging the sun wheel and an inner toothing of a drive wheel. The drive wheel is driven e.g. via a chain drive in a fixed gear ratio by way of the crankshaft. In this embodiment, an adjustment of the rotational angle is performed by rotating the sun wheel by use of an actuator. A disadvantage of such an embodiment is that, for arresting the sun wheel, it is required to supply voltage to an electric actuator because no automatic locking is provided for the drive. Further, a relatively large installation space is required particularly in the axial direction because the sun wheel can be driven only on the side of the planetary gear axially remote from the camshaft.

SUMMARY

It is an aspect of the present invention to provide a device for phase-shifting the rotational angle of a drive wheel relative to an output shaft, which device shall require a minimum installation space and, if an electric drive is used, shall save energy in comparison to known embodiments.

In an embodiment, the present invention provides for a device for phase-shifting a rotational angle of a drive wheel relative to an output shaft. The device includes a planetary gear including a sun wheel, a hollow wheel and at least one planet wheel, wherein the sun wheel and the hollow wheel mesh with the at least one planet wheel. A planet wheel carrier having the at least one planet wheel is arranged thereon and is fixedly connected to the output shaft so as to commonly rotate with the output shaft. A drive wheel is connected to the planetary gear and is at least indirectly connected to the sun wheel. An actuator engages the planetary gear so that the hollow wheel is rotatable relative to the sun wheel. The actuator is disposed tangentially to the planetary gear and includes a worm engaging an outer toothing of the hollow wheel, with the sun wheel being at least indirectly connected to the drive wheel. The phase shifting is thus obtained by rotating the hollow wheel. It is thereby possible to arrange the actuator tangentially to the planetary gear. As a result of the combination of this tangential arrangement and the worm gear of the actuator, a self-locking effect of the drive is obtained so that no energy needs to be applied for arresting the hollow wheel in operational states where the actuator is not being adjusted.

BRIEF DESCRIPTION OF THE DRAWINGS

The present invention is described in greater detail below on the basis of embodiments and of the drawings in which.

DETAILED DESCRIPTION

Figure 1:
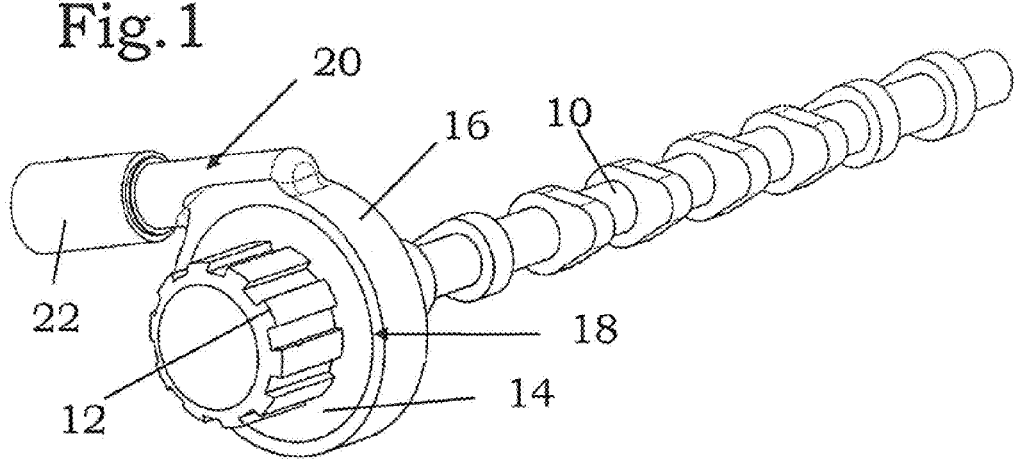
FIG. 1 is a perspective exterior view of an inventive device for phase-shifting a camshaft.

The drive wheel can be supported in a bearing housing via a drive wheel axis and comprises a lubricating-oil bore which is in fluid connection with a lubricating-oil bore of the output shaft. Thus, if the device is used as a phase adjuster for a camshaft, the lubricating-oil bore of the camshaft can be continued internally of the drive wheel axis so that the bearing units between the drive wheel and the bearing housing can be lubricated, cooled and cleaned in a simple manner without necessitating an additional oil circuit.

According to an embodiment, the bearing housing is fixedly connected to a gear housing, and the planetary gear and at least the worm of the actuator are arranged in the bearing housing and the gear housing. Thus, a common housing exists for the bearings of the drive wheel as well as those of the planetary gear which thereby will also receive oil via the lubricating-oil bores, whereby a long operating life will be guaranteed.

The planetary gear, the worm of the actuator and the bearing unit of the drive wheel can be integrated in the cylinder head of the internal combustion engine. Accordingly, the whole assembly can be arranged in the oil circuit of the internal combustion engine and can be encapsulated against the outside. Corrosion and contamination of rotating components and toothings can thereby be largely avoided, which again contributes to a long operating life.

According to an embodiment of the present invention, a moon wheel can be arranged between the hollow wheel and the at least one planet wheel for rotary transmission, said moon wheel engaging the inner toothing of the hollow wheel. Using gear assemblies allows for gear ratios of 1:1 or 2:1 so that, in case of a suitable camshaft geometry, the replacement of existing camshaft drive wheels might not be required.

According to an embodiment, a magnet is arranged between the hollow wheel and the planet wheel, said magnet communicating with a contactless sensor and thus allowing for a simple control by the existing bearing feed-back.

Thus, the invention proposes devices for phase-shifting the rotational angle of a drive wheel relative to an output shaft, which devices can be given a very small constructional size, thus allowing for optimum use of the small installation space available in an internal combustion engine. Due to the tangential arrangement of the actuator relative to the planetary gear and the self-locking of the gear, the energy consumption of the actuator is very low as compared to known embodiments.

The various embodiments of the present invention will also guarantee a long operational life of the device.

An embodiment of the present invention is illustrated in the drawings and will be described in greater detail hereunder by way of an example relating to a device for phase-shifting between a crankshaft and a camshaft.

In FIG. 1, there is illustrated an output shaft 10 formed as a camshaft driven by a drive wheel 12. Said drive wheel 12 is provided with an outer toothing engaged by a toothed belt which on its opposite end is running in a corresponding manner on an output drive wheel of a crankshaft; thus, the rotation of the crankshaft will be transmitted via the toothed belt to the drive wheel 12. Alternatively, of course, use can be made of chain drives.

Arranged between camshaft 10 and drive wheel 12 is an outer housing 14, 16 of a device for phase-shifting the rotational angle between drive wheel 12 and camshaft 10. Outer housing 14, 16 consists of a bearing housing 14 via which the drive wheel 12 is supported, and of a gear housing 16 surrounding a planetary gear 18 and parts of an actuator 20 provided with an electric motor 22, as depicted particularly from FIG. 2.

Figure 2:
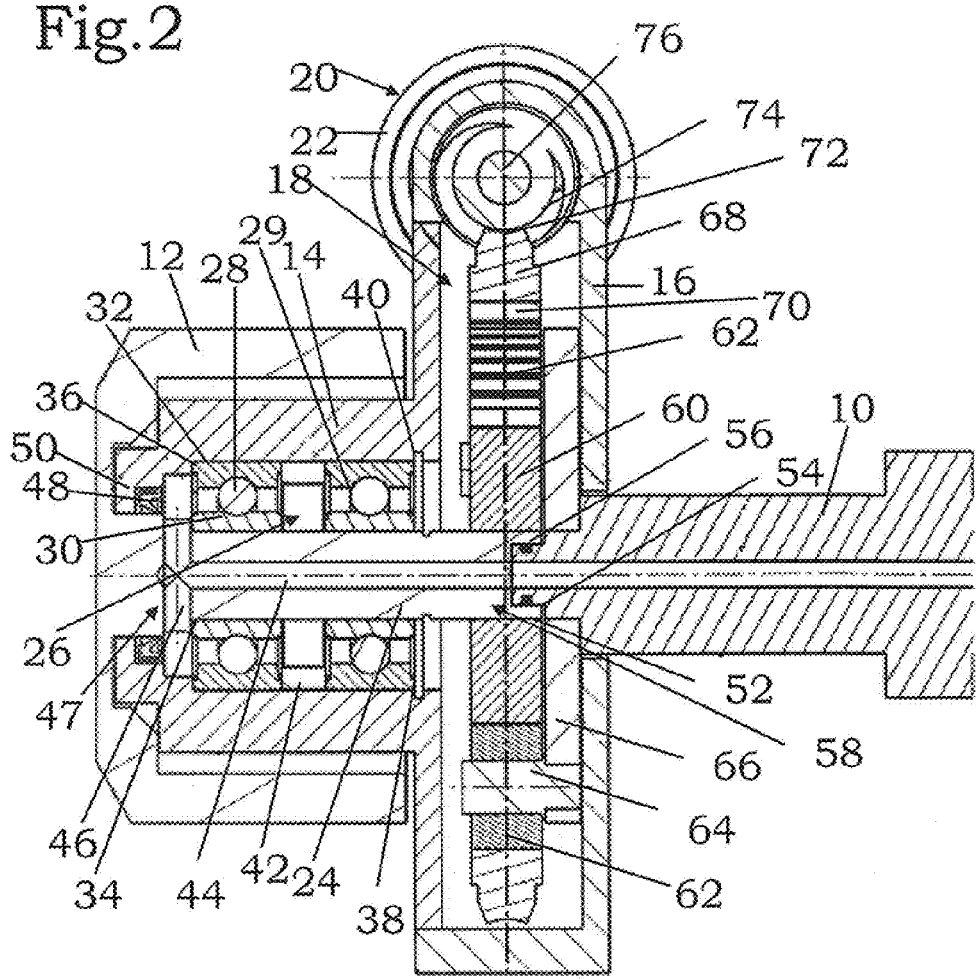
FIG. 2 is a lateral sectional view of the inventive device shown in FIG. 1.

From FIG. 2, the interior configuration of this device for phase-shifting is evident. Drive wheel 12 is provided with a drive wheel axis 24 via which the drive wheel is supported in the fixed bearing housing 14 by means of a bearing unit 26.

Said bearing unit 26 consists of two ball bearings 28, 29 having their inner rings 30 pressed onto the drive wheel axis 24 and their outer rings 32 fitted into bearing housing 14. The inner ring 30 of the first ball bearing 28 is supported against a stepped portion 34 on drive wheel axis 24 while the outer ring 32 of the first ball bearing 28 is supported against a stepped portion 36 of bearing housing 14. The outer ring 32 of the second ball bearing 29 is arranged in abutment on a Seeger ring 38 arranged in a groove 40 of bearing housing 14. Between the two outer rings 32 of bearing unit 26, a shell 42 is arranged.

For supply of oil to bearing unit 26, a lubricating-oil bore 44 of camshaft 10 is continued within drive wheel axis 24 and is guided, via a radial bore 46, past bearing unit 26 to a first end 47 of drive wheel axis 24. To avoid leakage of oil to the outside between bearing housing 14 and drive wheel 12, a lip sealing ring 48 is arranged in a recess 50 between bearing housing 14 and the first end 47 of drive wheel axis 24. The oil will thus remain internally of housing 14, 16.

Since the drive wheel 12 and thus the drive wheel axis 24 are desired to be rotatable relative to camshaft 10 and the lubricating-oil bore 44 shall nonetheless be continued into the drive wheel axis 24, an annular axial projection 52, formed on the second end 58 of drive wheel axis 24, is arranged to grip around the end of camshaft 10 comprising a stepped portion 54, with interposition of a sealing ring 56.

To the second end 58 of drive wheel axis 24, a sun wheel 60 of planetary gear 18 is fastened. Said sun wheel 60 meshes with three planet wheels 62 supported on axial journals 64 having their ends attached to a planet wheel carrier 66. Planet wheel carrier 66 is fastened to the end of camshaft 10 at least for common rotation therewith. Around the three planetary wheels 62, a hollow wheel 68 is arranged, its inner toothing 70 meshing with the planetary wheels 62. Hollow wheel 68 further has an outer toothing 72 engaged by a worm 74. Said worm 74 is arranged on a drive shaft 76 adapted to be actuated by electric motor 22.

Figure 3:
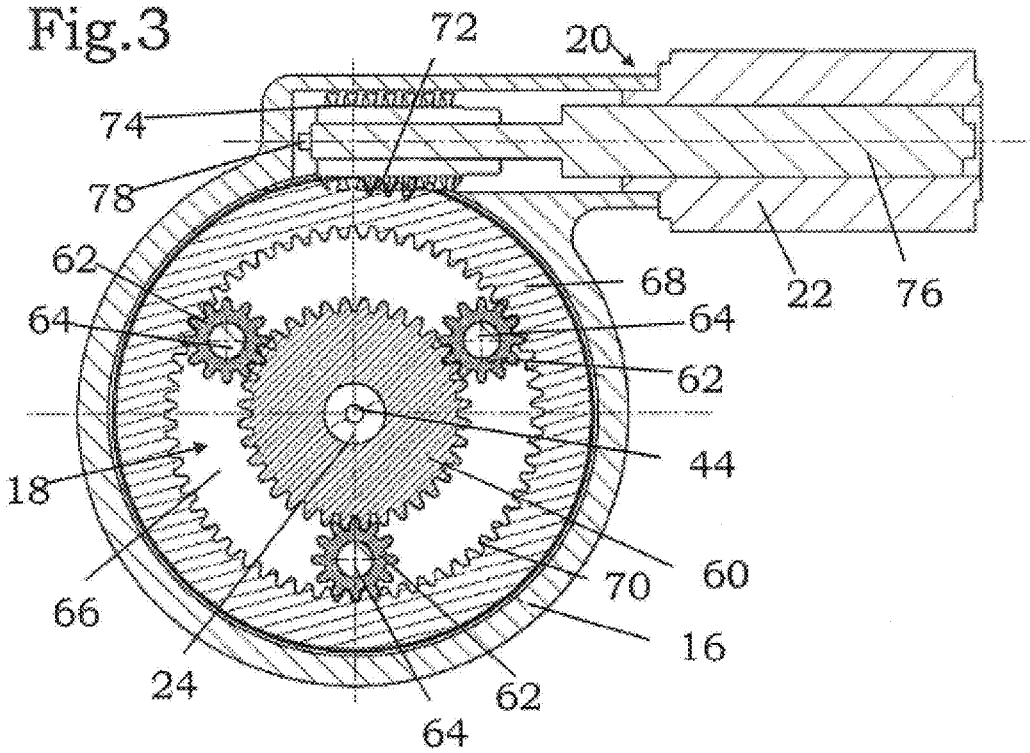
FIG. 3 is a sectional top view of the inventive device shown in FIGS. 1 and 2.

Said electric motor 22 as well as worm 74 and drive shaft 76 together form the actuator 20. The latter, except for electric motor 22, is driven by the gear housing 16, which is best seen in FIG. 3. The actuator 20 is thus fully integrated into the housing 16 of planetary gear 18 and therefore protected from environmental influences within the engine compartment. Fastened to the end of drive shaft 76 is a magnet 78 communicating with a contactless sensor, e.g. a Hall sensor (not shown), for bearing feedback.

Figure 4:
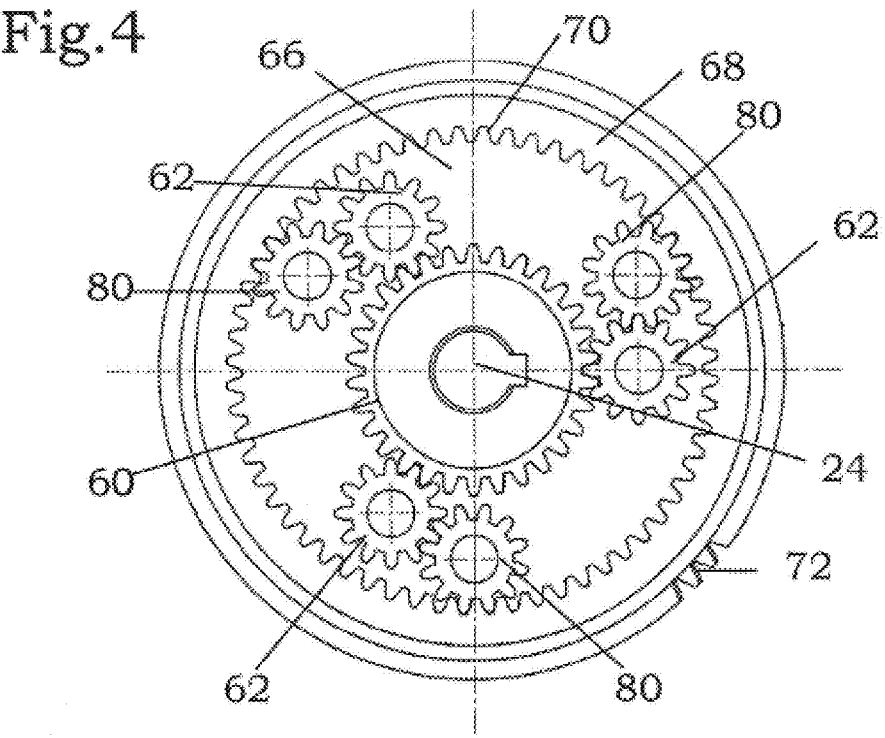
FIG. 4 is a top view of planetary gear with moon wheels, according to an embodiment of the inventive device.

The planetary gear 18 illustrated in FIG. 4 is different from the above described planetary gear in that, in addition to the planet wheels 62, moon wheels 80 are arranged in planetary gear 18, said moon wheels meshing with the planet wheels 62. While the planet wheels 62 are arranged to mesh with sun wheel 60, the teeth of moon wheels 80 engage the inner toothing of hollow wheel 68. Thereby, the gear ratio which in the embodiment according to FIGS. 1 to 3 is 2.66:1, can be altered to 1:1 or 2:1, thus allowing for the use of drive wheels 12 of known camshaft drives.

The functioning of the phase-shifting device will be explained in greater detail hereunder with reference to FIGS. 1 to 3.

In normal operation, the rotational movement of drive wheel 12 is transmitted via sun wheel 60 to the planet wheels 62. At the same time, the hollow wheel 68 is held fixed in position by the self-locking of worm 74. By the rolling movement of the planet wheels 62 on the stationary inner toothing 70 of hollow wheel 68, the movement of planet wheels 62 is transferred to output shaft 10.

Now, if the angle of rotation between drive wheel 12 and output shaft 10 shall be displaced by a specific phase, drive shaft 76 and thus worm 74 will be set in motion by electric motor 22. As a result, the hollow wheel 68 and, along with hollow wheel 68, also the planet wheels 62 as well as the planet wheel carrier 66 and the drive shaft 10 will be rotated by a specific angle, thereby effecting a rotation of camshaft 10 relative to drive wheel 12.

Thus, it is rendered possible in a simple manner to adjust e.g. the opening characteristic of inlet and outlet valves of an internal combustion engine over time in relation to the piston stroke.

It is evident that the whole assembly can be integrated into the cylinder head of an internal combustion engine so that the assembly will be located in the oil circuit of the internal combustion engine and thus will be encapsulated from the outside. The installation space required for such an assembly is extremely small, particularly concerning the axial extension with regard to the camshaft. In fact, particularly in the axial direction with regard to the camshaft, present-day internal combustion engines normally offer no installation space. Additionally, the installation space can be further reduced by using a suitable gear reduction since this will allow for smaller drive-wheel diameters. No restrictions are imposed on the adjustment angle.

It should be evident that the device of the invention may be subject to modifications regarding to its constructional design, e.g. with regard to the number of the planet wheels used, without leaving the protective scope of the claims.

What is claimed is:

1. A device for phase-shifting a rotational angle of a drive wheel relative to an output shaft, said device comprising:
   a planetary gear including a sun wheel, a hollow wheel and at least one planet wheel, wherein the sun wheel and the hollow wheel mesh with the at least one planet wheel;
   a planet wheel carrier having the at least one planet wheel arranged thereon and being fixedly connected to the output shaft so as to commonly rotate with the output shaft;
   the drive wheel connected to the planetary gear and at least indirectly connected to the sun wheel; and
   an actuator engaging the planetary gear so that the hollow wheel is rotatable relative to the sun wheel, wherein the actuator is disposed tangentially to the planetary gear and includes a worm engaging an outer toothing of the hollow wheel.

2. The device as recited in claim 1, wherein the output shaft is a camshaft.

3. The device as recited in claim 1, wherein the drive wheel is supported in a bearing housing via a drive wheel axis, the drive wheel axis including a first lubricating-oil bore in fluid connection with a second lubricating-oil bore of the output shaft.

4. The device as recited in claim 3, wherein the bearing housing is fixedly connected to a gear housing, and the planetary gear and at least the worm of the actuator are arranged in the bearing housing and the gear housing.

5. The device as recited in claim 1, wherein the planetary gear, the worm of the actuator and a bearing unit of the drive wheel are integrated in a cylinder head of an internal combustion engine.

6. The device as recited in claim 1, further comprising a moon wheel disposed between the hollow wheel and the planet wheel for rotary transmission, the moon wheel engaging an inner toothing of the hollow wheel.

7. The device as recited in claim 1, further comprising a magnet disposed on the actuator and communicating with a contactless sensor.

* * * * *